Inventor
E. O'Toole, sr
By Pattison Wright & Pattison
Attorneys

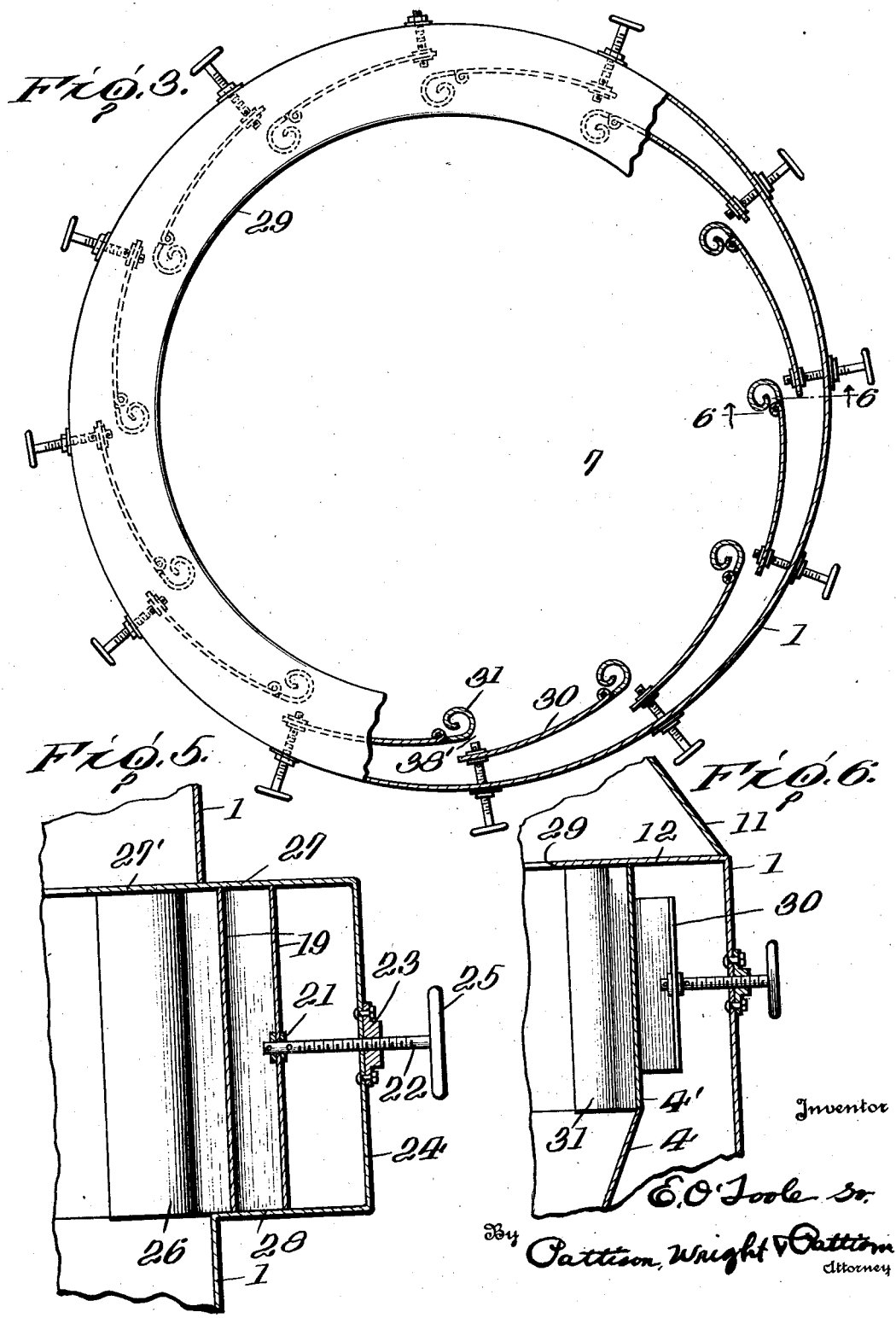

Patented June 13, 1933

1,914,282

UNITED STATES PATENT OFFICE

EDWARD O'TOOLE, SR., OF GARY, WEST VIRGINIA

FILTER FOR REMOVING DUST FROM THE AIR

Application filed March 19, 1931. Serial No. 523,906.

This invention has relation to improvements in filters for removing dust from the air and is particularly intended to take the dust laden air from a dry coal cleaning apparatus and remove the dust from it, though it may be used in connection with any other form of apparatus, space or chamber which contains dust laden air, and remove from the air its contained dust.

One object of the invention is to clean dust laden air without the use of fabric, and to so construct the filter that rapping of its surfaces is unnecessary.

A further object of the invention is to construct a simple effective mechanical means for removing dust from air and collecting the same and finally lead the cleaned air to any desired place for use or to permit it to escape.

This invention has the further object of taking the dust laden air from a dust hood of a dry coal cleaning apparatus and remove from it substantially all dust, the said cleaned air being capable of being conveyed under the porous deck of the separating apparatus and caused to pass through the porous deck, the said air becoming again dust laden and the apparatus removing the dust from it, whereby the operation may be continuous.

In the drawings:

Fig. 3 is an enlarged cross sectional view of Figure 1 taken on the line 3—3.

Fig. 5 is a vertical sectional view on the line 5—5 of Figure 2.

Fig. 6 is a vertical sectional view on the line 6—6 of Figure 3.

Figure 1:
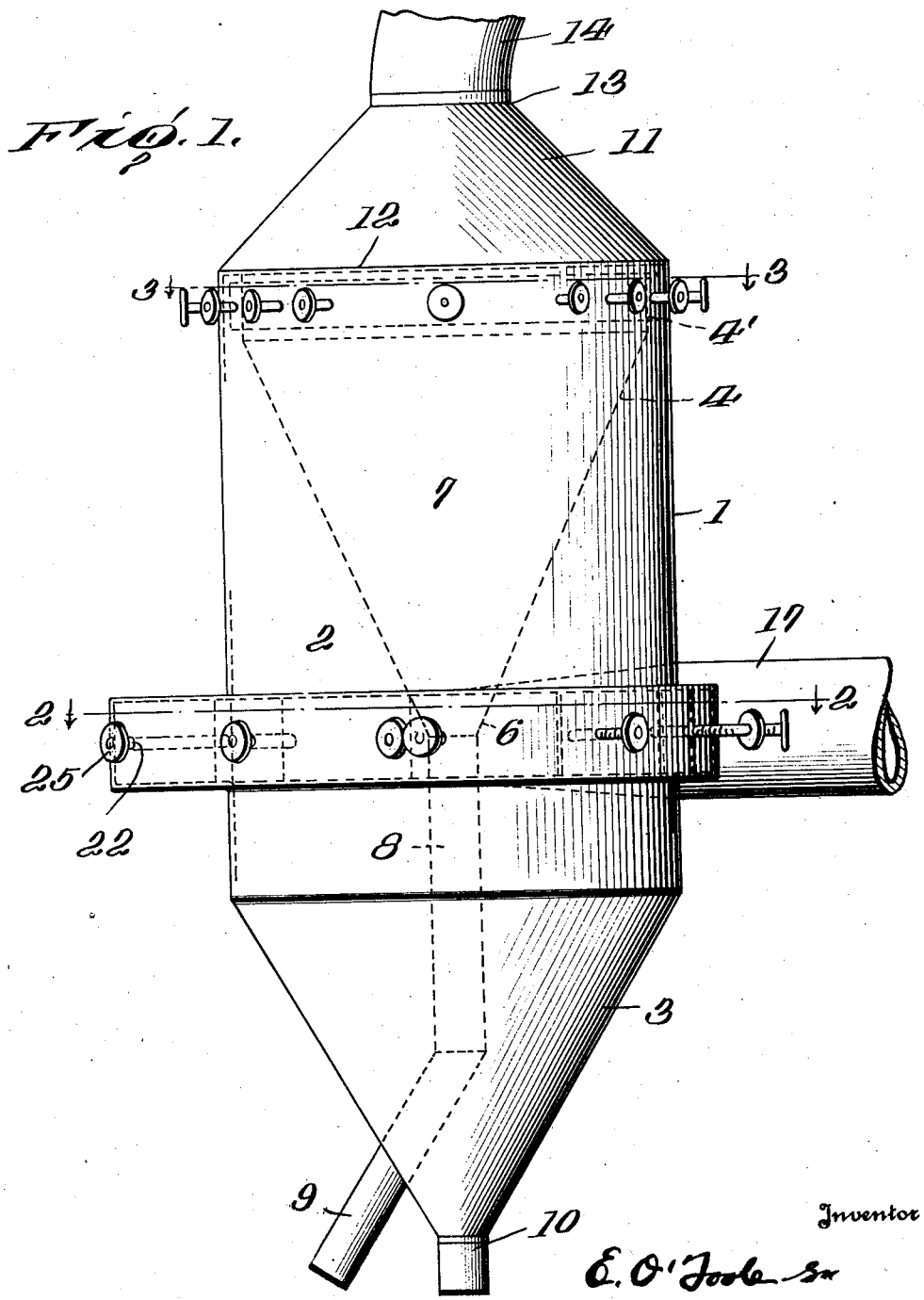
Figure 1 is a side elevation of a dust filter which embodies my present improvement.
Figure 2:
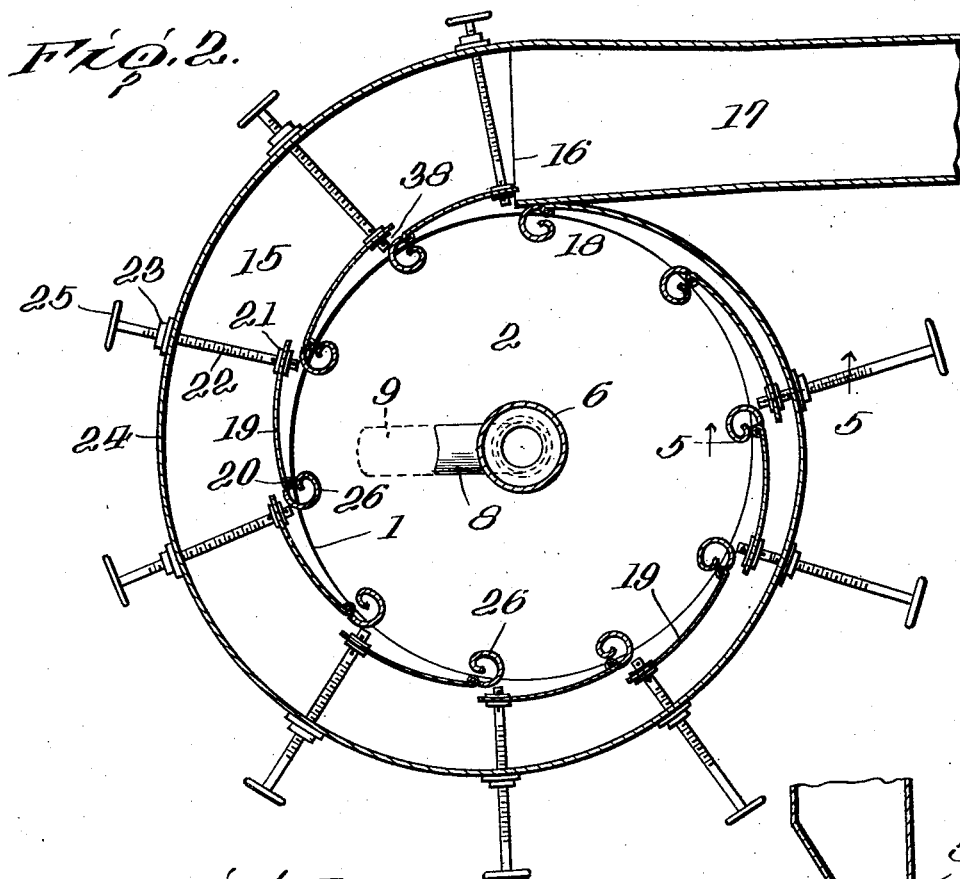
Fig. 2 is a section on line 2—2 of Figure 1, Figure 2 being on substantially the same scale as shown in Figure 1.
Figure 4:
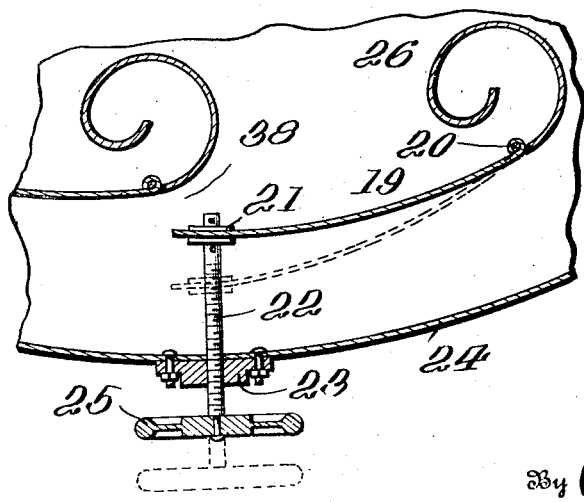
Fig. 4 is an enlarged sectional view of a part of Figure 1 showing one of the adjustable vanes or gates for controlling the passage of air through the filter.
Figure 7:
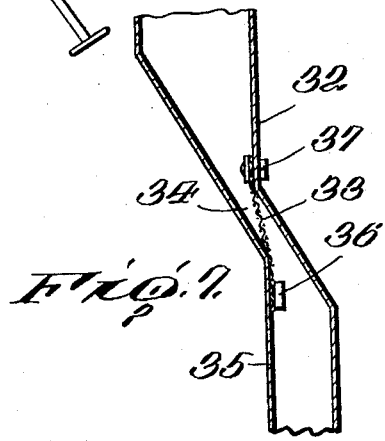
Fig. 7 is a vertical sectional view of the dust outlets for the filter.

As is well known it is usual in dust filters to utilize fabric as the means for permitting the flow of air through it and at the same time preventing the passage of the dust that is contained in the air. It is also well known that it is usual to use knockers for vibrating the material containing dust thus preventing to some extent, its accumulation on the collecting surface. In the form of apparatus here shown and which will now be described both the fabric and the knockers are entirely eliminated.

My improved filter consists of a vertically arranged chamber 1. This chamber is preferably composed of metal though it may be composed of other imperforate material. This receptacle 1 is provided with a chamber 2, the said chamber extending to the lower end of the cylinder 1 and this cylinder has its lower end formed in a cone shaped portion 3, which is in communication with the chamber 2 above. Located within said chamber is a conical member 4 having its upper end enlarged as at 5 and its lower end contracted as shown at 6, thus forming a cone shaped chamber 7. The lower end 6 is a depending outlet pipe 8 that extends downwardly and passes through the cone 3 as shown at 9. The lower end of the conical portion 3 of the chamber 2 has an outlet pipe 10. A conical shaped member 11 has its lower enlarged end 12 connected with the embraced cone shaped member 7 and this conical shaped member 11 contracts from its enlarged end 12 to its upper reduced end 13. It will be understood that the conical shaped upper end 11 forms a continuation of the chamber 7 and that 14 is the outlet from its chamber.

Surrounding the cylinder is a chamber 15 which encircles or embraces the cylinder 1 and extends around it in spiral form its largest end 16 communicating with an inlet member 17 while its opposite or outlet end 18 communicates with the chamber 2. The inner wall of this spiral shaped embracing chamber 15 is composed of a plurality of adjustable gates or valves 19. These gates have their ends 20 pivotally connected with the upper and lower walls of the chamber 15 while their opposite movable ends 21 are adjustable in and out by means of screw-threaded members 22 which pass through internally screw-threaded members 23 which are attached to the outer face of the outer vertical wall 24 of said chamber, while the outer ends of the screw-threaded rods 22 are provided with handles 25.

Located at the pivoted ends of the gates 19 are vertically extending coiled members 26 which serve in the manner hereafter explained to collect a part of the dust from the air. These members 26 have their ends permanently attached to the upper and lower walls 27 and 28. The operation of those parts just described will be set forth hereinafter.

Attention now is particularly called to the enlarged view Figure 3. Located at the junction of the lower and upper ends of the conical members 11 and 4 is a circular chamber 29 and this circular chamber has its inner wall provided with a plurality of gates 30. These gates are constructed like the gates 19 of the spiral chamber 15 and the coiled portions 31 are constructed like the coiled portions 26 of said chamber 15. Therefore it is unnecessary to describe this more in detail, and likewise the operation of the last mentioned parts in both chambers 15 and 29 is the same.

Communicating with the lower ends 9 and 10 are automatic valves which automatically release the collected dust from both said outlets. These automatic releasing dust members consist of an upper portion 32 which communicates with the lower portion of the outlets 9 and 10. Attached at its upper end is a diaphragm 33 which extends downward and closes the communication 34 between the upper portion 32 and the lower portion 35 of these outlets. The lower end of these diaphragms carries a suitable weight 36, the upper ends of these diaphragms being connected with the attachment 37 in a manner that permits the lower end to move away from the wall 35. This arrangement prevents air passing through the outlets but permits the dust that is collected in the portion 32 by its weight to move the lower end of the diaphrgam 33 away from the wall 35 and permit the collected dust to escape. This diaphragm may be made of heavy cloth, leather, rubber or other suitable material.

In operation an exhaust fan (not shown) is connected with the outlet 14 which draws air through the inlet 17 and through the machine. The dust laden air passing through the inlet 17 enters the larger end 16 of the chamber 15 and this air strikes the spiral wall 24 and part of it passes through the opening 38 into the chamber 2. Likewise a certain amount of dust laden air passes through the succeeding openings between the outer sides of the curved portions 26 and the adjacent sides of the adjustable ends 21.

The air is given a curved motion by striking the outer spiral wall 24 and since part of the air passes into the chamber 2 the volume of the air in the chamber 15 is gradually reduced from its large end 16 to its final smaller outlet 18. The heavy particles of the dust strike the inner sides of the gates or valves 19 and these heavy particles fall downward into the chamber 2. Likewise the heavier particles in the chamber 15 strike the outer wall 24 and fall downward and these particles are continually moved and continually moving inward by the circulation of the air in the said chamber until they finally pass through the openings 13 into the chamber 2 and they fall to the lower outlet end 10 of said chamber 2. Those particles of the air which may not be removed by contact with the inner surface of the gates or vanes 19 by contact with the coiled portions 26 are separated and they also fall downward into the chamber 2. As seen in Figure 5 the lower ends of the curved portions 26 are open while their upper ends 27' are closed. All of the heavier particles of the air therefore are collected in the cylinder 1 and they fall in the cylinder to the outlet 10. That part of the air within the chamber 2 which contains the finer particles of dust which remain in suspension flow upward to the chamber 29 and pass from the said chamber through the outlets 38' into the conical chamber 7 and the coiled parts 31 act to collect the heavier particles that are suspended in the air in the same manner as the coiled parts 26 of the chamber 15.

From Figure 1 it will be seen that the upper ends 4' of the conical chamber 7 are removed from the wall 1 so that all the air containing the dust in suspension from chamber 2 must pass through this restricted portion into the chamber 29.

The gates or vanes 19 and 30 are capable of adjustment so that the amount of air flowing into the chamber 2 is controlled by these gates 30 and the amount of air passing from the chamber 2 into the conical portion 11 is controlled or regulated by the gates 30.

From the foregoing description it will be seen that my apparatus includes means which first separates the heavier particles of the dust laden air and that the dust remaining in suspension in the air is again subjected to further friction and removing from the air those particles that remain in suspension and these separated previously suspended particles fall into the conical member 7 and finally reach the outlet end 9 which is in communication with the automatic dust releasing valve 33. The apparatus acts therefore to first remove the heavier particles and then subjecting the air to a further cleaning which serves to remove the particles which remain suspended in the air thereby substantially cleaning the air so that when it escapes from the outlet 14 the dust contained in the air is substantially removed.

This apparatus is especially intended for use in connection with a dry coal cleaning machine of which there are now several types. It is unnecessary to describe the several types. All of them are adapted to be enclosed within a dust hood (not shown) and this filter is connected with the outlet of the dust hood. In the dry cleaning of coal it is well known by reference to patent to Sutton, Steele & Steele No. 1,073,644 dated September 23, 1913 that they contain a pervious deck through which air flows to lift the coal particles from the heavier particles. Therefore with an apparatus working on the principle of the said Sutton, Steele & Steele patent this filter can be readily connected with any hood that encloses the deck and furthermore the outlet end of the hood can be connected with the fan that is supplying air under the deck, the fan serving to draw cleaned air from this filter and force it through the separating apparatus. This arrangement would cause the air to be utilized over and over in connection with a coal cleaning machine by a single fan.

However I wish it understood that this filter can be utilized in other relations. It can be connected with any chamber, room or apparatus in which there is dust laden air that it is desired to clean.

I further desire it understood that while I have explained the present invention in considerable detail it may be changed in many of its parts without departing from the spirit of my present invention so long as such changes come within a liberal interpretation of the appended claims.

The above apparatus eliminates the use of fabric without any appreciable loss of filtering efficiency; it eliminates knockers for rapping the surface and it does not require reversal of the air being cleaned; it can be constructed complete in the shop reducing the cost of field erection; permits the use of a single fan to supply air to the separator and to clean the dust laden air passing from the separator and it embodies other advantages which will occur to anyone skilled in the art.

Having thus described my invention what I claim and desire to secure by Letters Patent is:

1. An apparatus for cleaning dust laden air comprising an elongated vertical cylinder provided at its lower portion with an encircling chamber having a plurality of gates located between the inner wall of said chamber and the outer wall of said cylinder, a conical cylinder having its enlarged end smaller than and enclosed within the upper end of said cylinder thereby forming a space between the outer wall of said conical member and said cylinder, the upper and larger end of said enclosed conical member having a plurality of gates communicating with the upper end of the conical member and with said space between the cylinder and the upper end of the conical member, the upper end of said cylinder provided with an air exhausting connection, said first mentioned surrounding chamber having an inlet communicating with said second chamber through which dust laden air is drawn into the cylinder through the gate openings and said dust laden air passing through the restricted space between the upper end of said conical member and said cylinder into the upper end of the conical member and thence drawn through the outlet at the upper end of said cylinder.

2. An apparatus for cleaning dust laden air comprising an elongated vertical cylinder having at one portion a surrounding chamber having a dust laden air inlet and the inner wall of said chamber communicating through gates to the said cylinder, a conical member in the said cylinder and above said chamber having its upper enlarged end also within and enclosed by said cylinder and spaced from the inner surface of said cylinder, the inner wall of said conical member formed by gates establishing communication between a space located between said upper end of the conical member and the cylinder whereby dust laden air is drawn from said conical member into the upper extremity of said cylinder, the upper end of the cylinder having a passageway through which air is drawn, whereby dust laden air is drawn through the first mentioned chamber at the lower end of the cylinder into the space between the conical member and the cylinder the heavy particles falling to the lower end of said cylinder and the remaining dust laden air passes between the restricted portion at the upper end of said conical member into the passageway at the upper end of said cylinder and the heavy particles remaining in said dust laden air falling within the conical member, said reduced end of the conical member having an outlet for the heavy particles and the lower end of the cylinder having a separate outlet for the heavy particles therefrom.

3. An apparatus for cleaning dust laden air comprising a vertical elongated cylinder having its lower end contracted and provided with an outlet, a conical member within the cylinder having its enlarged end spaced from and enclosed within the said cylinder and its lower contracted end located above the lower end of the cylinder and having an outlet at its lower end, a chamber surrounding the outer lower portion of said cylinder and having a plurality of gates establishing communication with the cylinder and also having an inlet communicating with said chamber to receive the dust laden air to be cleaned whereby the heavy particles strike the conical member and they fall to the lower end of the cylinder said remaining dust laden air passing through between the upper enlarged end of the conical member and the wall of the said cylinder to the upper end of the cylinder, the upper end of the cylinder having an outlet through which the air is drawn whereby the heavy particles remaining in the air within the conical member fall therein, the parts operating for the purpose set forth.

4. An apparatus for cleaning dust laden air comprising a vertical cylinder having a surrounding chamber at its lower portion having communication with the cylinder through gates, said gates being adjustable, the inner ends of said gates provided with vertically arranged coil portions adapted to intercept and collect part of the heavy portions which fall within the cylinder, an inlet for the dust laden air connected with said chamber, a conical member enclosed within the said cylinder and located above the said chamber the enlarged upper end of the conical member forming a space between it and the said cylinder, the upper end of the conical member provided with gates establishing communication between it and the upper end of the said cylinder, the upper end of said cylinder having an outlet through which the air is drawn, the parts operating substantially as and for the purpose set forth.

In testimony whereof I hereunto affix my signature.

EDWARD O'TOOLE, Sr.